United States Patent

[11] 3,566,029

[72] Inventors Arnold S. J. Lee
1402 Bergen Blvd., Fort Lee, N.J. 07024;
David H. Margolien, 12 Ingleside Road,
Lexington, Mass. 02173

[21] Appl. No. 669,486
[22] Filed Sept. 21, 1967
[45] Patented Feb. 23, 1971

[54] IMAGE SCANNING, TRANSMISSION AND RECEPTION
11 Claims, 7 Drawing Figs.

[52] U.S. Cl. .......... 178/7.6
[51] Int. Cl. .......... H04n 3/08
[50] Field of Search .......... 178/6, 7.6

[56] References Cited

UNITED STATES PATENTS

| | | | |
|---|---|---|---|
| 1,291,481 | 2/1931 | Tervo | 178/7.6 |
| RE18,761 | 3/1933 | Centeno | 178/7.6 |

*Primary Examiner*—Richard Murray
*Attorney*—George T. Craig

ABSTRACT: An image-transmitting system in which the transmitting and receiving scanners are identical. Each scanner has a spring-driven mirror for horizontal scan, and another mirror for vertical scan. The scanning movement of both mirrors is initiated by an electrical pulse from a separate pulse source and mechanical means controls scanning movement.

IMAGE SCANNING, TRANSMISSION AND RECEPTION

BACKGROUND OF THE INVENTION

This invention relates to image scanning, transmission and reception, and more particularly to a novel system and apparatus employing novel mechanical scanning means, both of which are of a nature, in accordance with this invention, to transmit image signals over a telephone line from one subscriber's telephone set to another similar set serving as a receiving station, or over any other communications channel.

Heretofore scanning apparatus for generating image signals has been either relatively complex and costly, or incapable of transmission and reception images of "picture" quality. This apparatus is generally referred to as "facsimile telegraph" apparatus. The use of simpler scanning apparatus has been limited to the transmission of typed or printed material where mere legibility of the received copy was sufficient to justify use of the apparatus of simpler design. For other applications, such as the transmission of photographs or full-tone images, the requirement for reproduction fidelity and good definition has been met only by complicated scanning apparatus, and phasing and synchronizing systems therefor.

In accordance with the present invention a novel mechanical scanner is provided which can serve to generate or record image signals and which is responsive to the novel phasing system of this invention. Transmission and reception is readily accomplished over an ordinary telephone line within the voice frequency range.

It is an object of the present invention to attain improved scanning with linearity of sweep trace of both horizontal and vertical scan lines and image signal synchronization and phasing by mechanical means responsive to timed electrical pulses.

Another object of the invention is to provide, in scanning mechanism of the oscillating mirror type, mirror-driving means operative to execute scanning sweep traces solely by self-actuating mechanical means triggered in response to an electrical impulse or "sync" signal.

Still another object of the invention is to record transmitted pictures photographically by use of a POLAROID Land roll film back or similar devices having provision for a finished copy in a very short time without recourse to a dark room and developing accessories or to any "wet" developing process.

BRIEF DESCRIPTION OF THE DRAWING

Referring to the drawing.

DESCRIPTION OF TYPICAL EMBODIMENT

Figure 1:
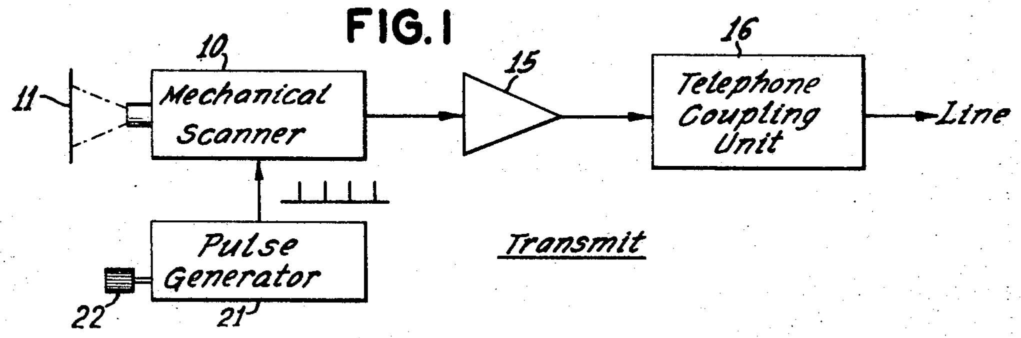
FIGS. 1 and 2 are block diagrams of transmitting and receiving stations, respectively, embodying the invention and shown by way of example in a picture-transmitting system utilizing a telephone circuit for the transmitting channel.
Figures 2, 6:
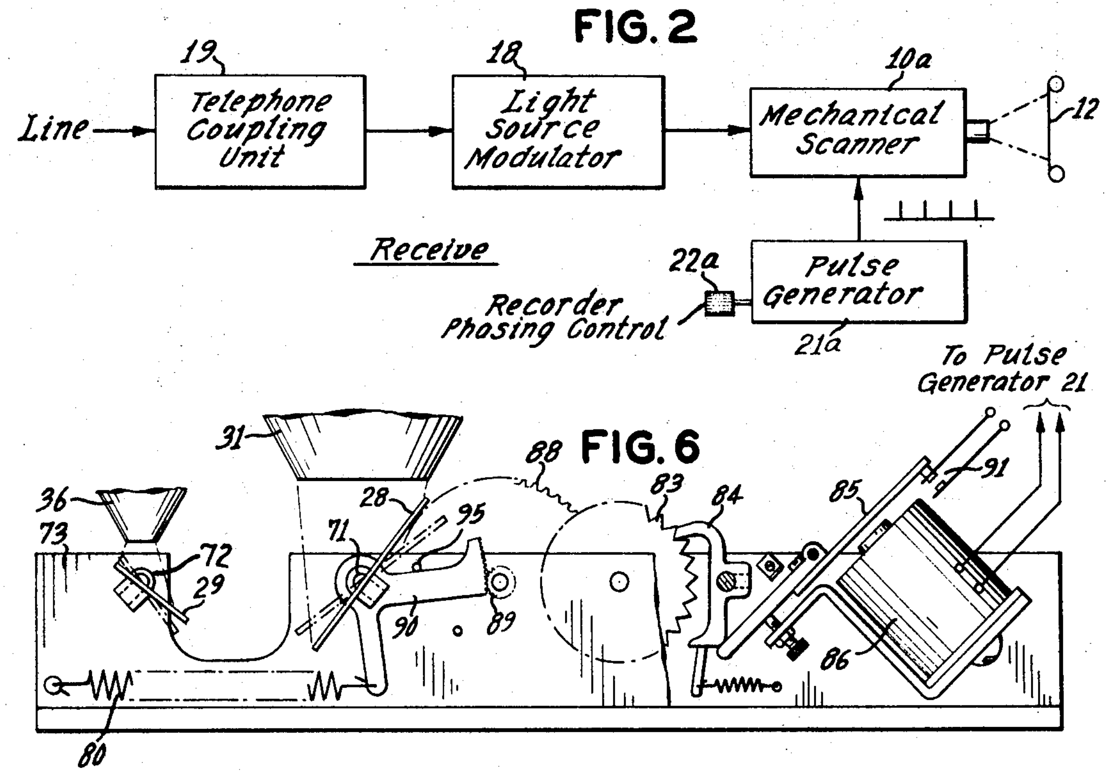
FIG. 6 is a view in side elevation complementing the showing of FIG. 5.

Referring to FIGS. 1 and 2, a system of communication by the transmission and reception of images is shown by way of example, in which a mechanical scanner 10 embodying the invention is arranged to scan successive elemental areas of an image or picture 11 and convert impinging light or other radiation variations into electrical impulses. A second scanner 10*a*, like the scanner 10, is employed at the receiving station, FIG. 2, to record the transmitted picture upon a record receiving medium 12. The optical and electrical components and the optical light paths, apart from the scanner mechanism of the present invention, are well known and require no detailed explanation herein. A device 15 includes an amplifier and modulator and may include an oscillator for generating a carrier frequency. However, a separate carrier wave source may be employed. The oscillator frequency deviation, if frequency modulation is employed, will, of course, be confined to the passband of the telephone line shown illustratively in FIGS. 1 and 2. It is within the scope of the invention to employ amplitude or other modulation processes and wide band transmission may be practiced. Amplifiers and modulators are well known and need not be shown or described for an understanding of this invention. The image information-bearing signal from the scanner 10 is applied to the device 15 and the output from this device is coupled to the telephone line through the transmitter of the telephone subset and an acoustic or other suitable coupler 16.

At the receiving station, the image signals are picked up and coupled to a light source modulator 18 by a known telephone coupler 19. The modulated light output of the modulator 18 is deflected or swept across the recording area 12 by the scanner 10*a* to produce an image of the subject image 11. The recording may, for example, be accomplished by a POLAROID Land film back as mentioned above.

Figure 7:
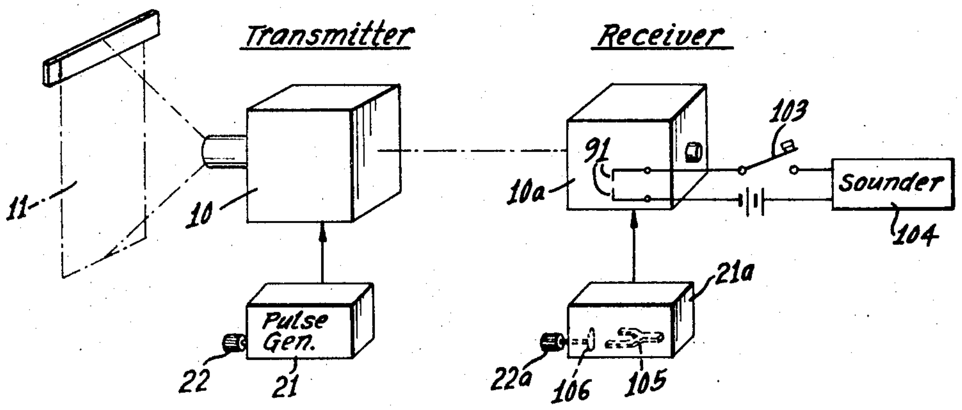
FIG. 7 illustrates phasing mechanism of this invention that may be employed for phasing the transmitting and receiving apparatus shown in FIGS. 3 to 6.

To maintain the scanners 10 and 10*a* in phase and scansynchronism, each is provided with a constant frequency pulse source 21 and 21*a*. The phase of one scanner, 10 or 10*a*, is adjusted as required at the commencement of transmission by a control knob 22 or 22*a* (FIGS. 1, 2 and 7).

Figure 3:
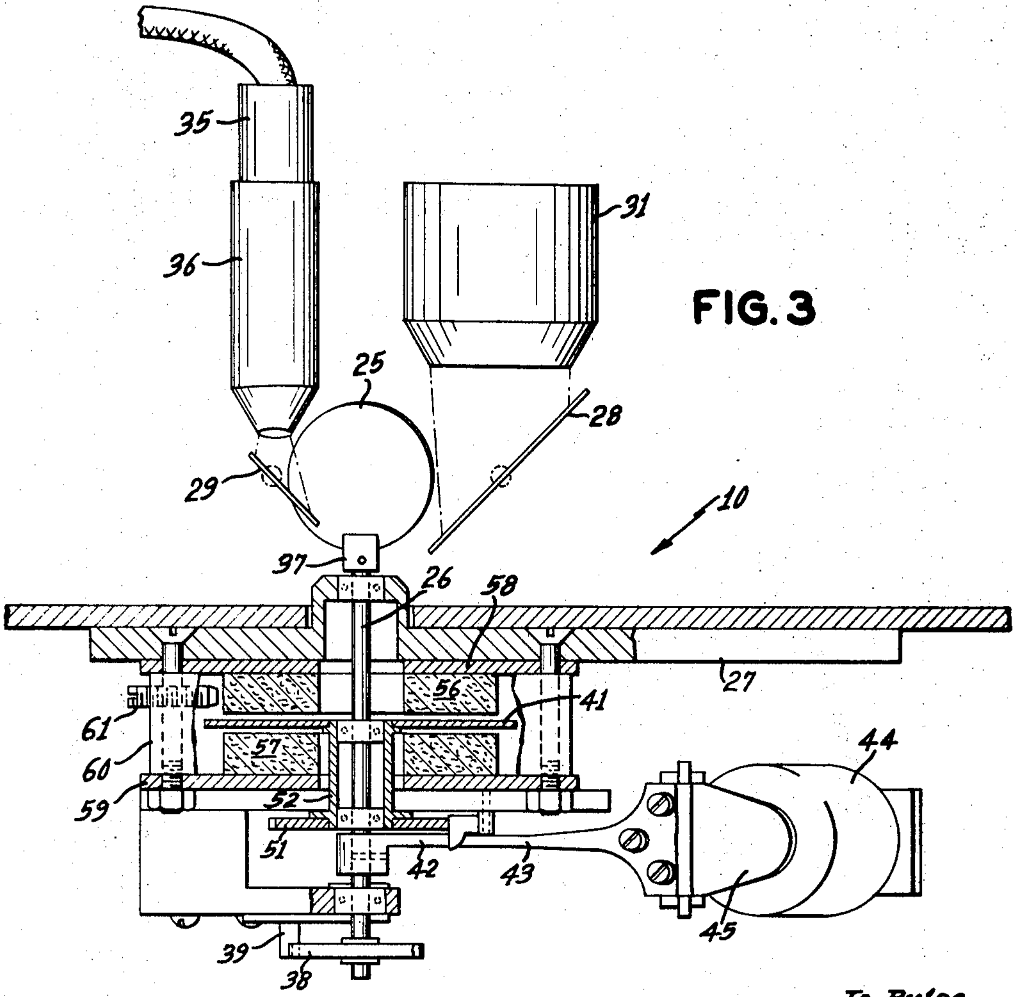
FIG. 3 is a side elevational view, partially in section, of an illustrative embodiment of a mechanical scanner embodying the invention, the top of the apparatus being positioned at the left of the sheet of the drawing.
Figure 4:
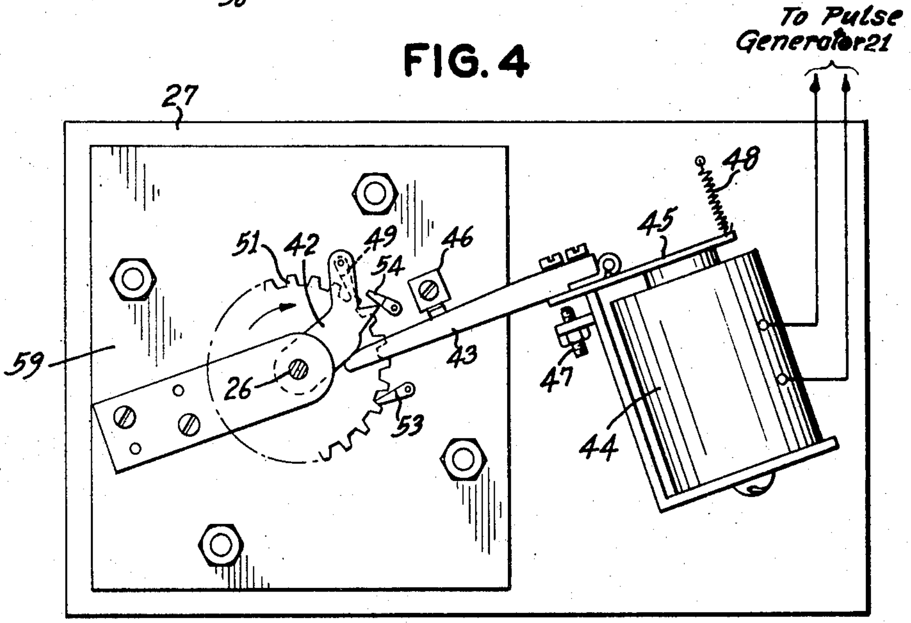
FIG. 4 is a view in side elevation, taken from beneath FIG. 3 as it appears on the drawing, FIGS. 3 and 4 showing in detail the horizontal scan or line scan mirror.
Figure 5:
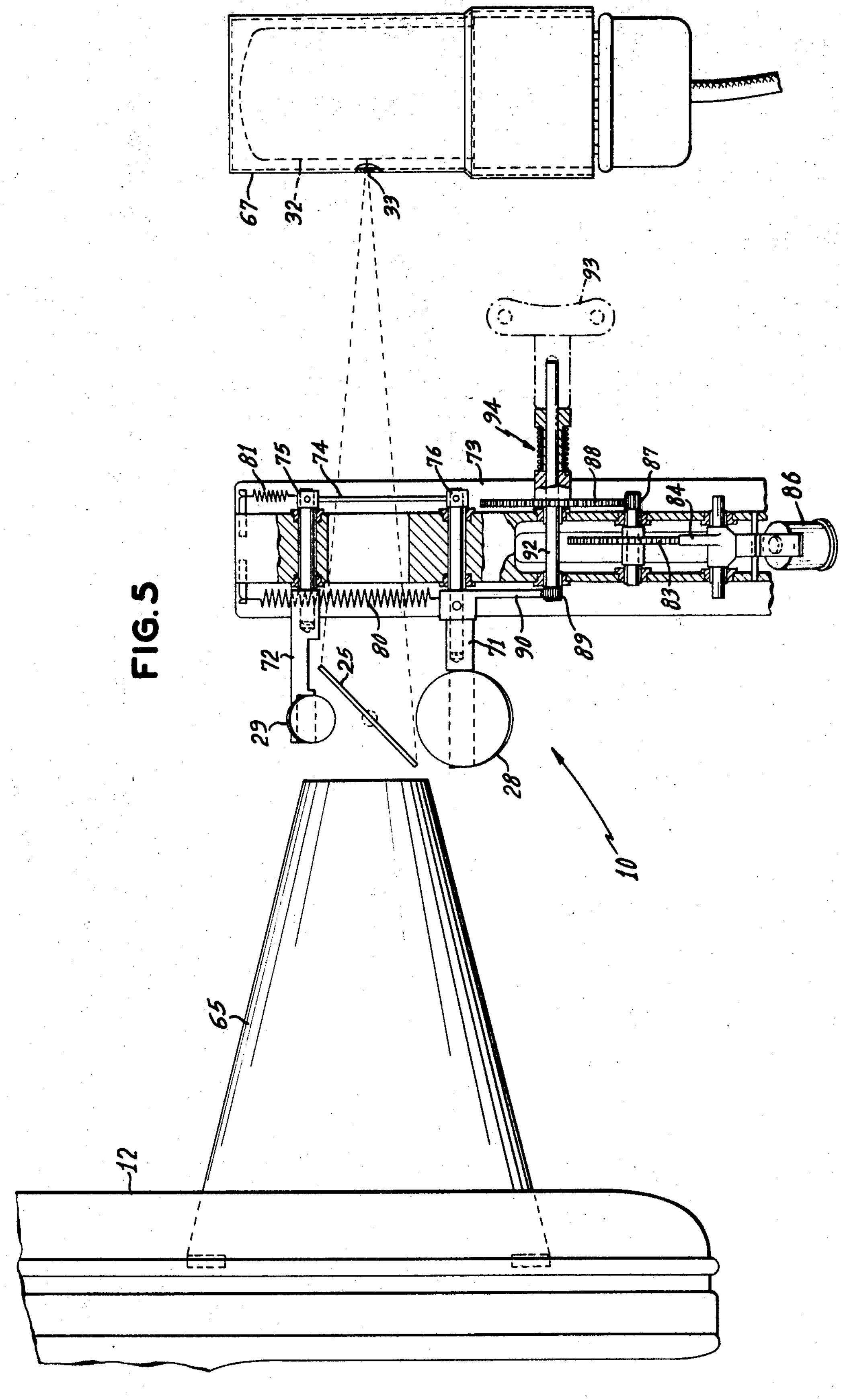
FIG. 5 is a view, partially in section, of the apparatus of FIGS. 3 and 4 showing details of the drive mechanism for the vertical scanning mirrors, the holder for the record-receiving medium and the photocell, the top of the apparatus being positioned at the top of the drawing.

The mechanical scanner 10 of this invention, shown more in detail by FIGS. 3 to 6, is of simple construction, easy to operate by untrained personnel, and requires little or no adjustment or maintenance during a prolonged period of service. As shown by FIGS. 3 and 4, the scanner 10 comprises a pivoted line-scan or horizontal deflection mirror 25 suitably secured to one end of a shaft 26 journaled in the supporting frame or chassis 27, and two adjacent vertical scanning mirrors 28 and 29 pivotally mounted as shown by FIG. 5. The reflecting surfaces of the mirrors 25, 28 and 29 may be planar and the mirror 25 is provided with reflecting surfaces on both sides. The pivoted mirrors effect two-dimensional scanning in general in the same manner as known oscillating-mirror scanners.

For transmitting, the pickup optical system 31 transmits light to the mirror 28 which is reflected by one side of the mirror 25 to the photocell 32 (FIG. 5) through an aperture 33.

For recording, modulated light from the light source such as a lamp 35 is transmitted through the optical focusing system 36 and the mirror 29 to the opposite side of the mirror 25 and the recording medium 12, such as a film or other recording medium. It will be understood that a suitable lightproof enclosure (not shown) is provided for the scanning mechanism.

As shown in FIGS. 3 and 4 the oscillatory mirror 25 is attached to one end of the shaft 26 as stated above by a clamp 37, and a spiral spring 38 under tension is attached to the other end of the shaft. The outer end of the spring 38 is attached to a fixed lug or bracket 39. Also attached to the shaft 26 are a highly electrically conductive metallic disc 41, for example in the form of a flat aluminum disc, and an actuating arm 42. The actuating arm 42 is positioned in the path of an oscillating drive arm 43 impulsed by drive means responsive to precisely timed pulses from the pulse generator 21. As shown by way of example, the drive means comprises an electromagnet 44 and a pivoted armature 45 similar to the ordinary electromagnet relay. The armature 45 is attached to the drive arm 43, which operatively engages the actuating arm 42 in a manner to be explained. The drive means also includes adjustable stop members 46 and 47 for the pivoted armature 45 and the arm 43, and a biasing spring 48. The actuating arm 42 carries a pivoted pawl 49 engaging a ratchet wheel 51 attached through a hollow shaft 52 to the disc 41. Pawls 53 and 54 prevent reverse movement of the ratchet wheel 51 and limit the advance movement of the wheel for each driving pulse to the distance between adjacent ratchet teeth.

Upon the occurrence of each pulse from the pulse generator 21, the electromagnet 44 is momentarily energized to very quickly reset the mirror 25 to its "start" position at the beginning of each scanning line by the actuating arm 42. This initiates a scanning excursion. The shaft 26 and the scanning mirror 25 are then turned by the biasing spring 38 at substantially constant velocity for executing an excursion at substantially constant velocity across the field to be scanned in one of the component directions of scan. In the illustrative example the field is either the subject image or picture 11, or the record-receiving medium 12. The shaft 26 and the scanning mirror are turned as the actuating arm 42 turns in a clockwise direction as indicated by the curved arrow on FIG. 4. Since the arm 42 is connected through the pawl 49 and the ratchet wheel 51 to the disc 41, the disc turns and serves to maintain the desired uniform deflection of the scanning 25 during each line scan as pointed out above.

In its preferred form, the metallic disc 41 is an eddy-current disc positioned between two toroidal ceramic magnets 56 and 57 attached to parallel plates 58 and 59 of ferromagnetic material, such as soft iron. The eddy current disc 41 mounted between the magnets 56 and 57 maintains a constant drag torque upon the shaft 26 and, since the torque of the spring 38 is substantially constant through the small angle through which the shaft 26 and the mirror 25 are deflected during each line scan cycle, the mirror moves at a constant predetermined rate. The precise deflection velocity may be adjusted as desired by an adjustable magnetic shunt 61 threaded into an iron collar 60. It will be noted that the retarding disc 41, which controls the deflection of the mirror 25, is disconnected from the actuating arm 42 and the shaft 26 during the reset cycle so that the resetting of the mirror 25 to the start position is not retarded thereby.

Referring to FIGS. 5 and 6, the record-receiving medium 12 is shown by way of example as a POLAROID Land film back enabling the received image to be developed and fixed in a matter of seconds after completing the transmission. The term "back" is used herein to designate a holder for the selective exposure of a roll, cartridge or pack of film or other radiation sensitive material. A conical light shield or bellows 65 is disposed between the medium 12 and the "record" side of the line scan mirror 25. In transmitting, the scanning beam is reflected from the other side of the mirror 25 through the aperture 33 in a light tight cover 67 for the phototube 32.

The oscillating vertical scan mirrors 28 and 29 are attached to pivoted shaft 71 and 72 rotatably carried by a base or support 73. The shafts 71 and 72 are connected together by a rod 74 and lever arms 75 and 76 to rock both oscillating mirrors in unison. The mirrors 28 and 29 are biased in the scan direction by two tension springs 80 and 81, and are deflected during each scanning cycle at a rate determined and controlled by suitable escapement mechanism, such as an escapement wheel 83 and a cooperating pawl 84. The pawl 84 is actuated by the armature 85 of an electromagnet 86 connected to the pulse generator 21. Thus the escapement wheel 83 advances one tooth for each timed control pulse and permits corresponding incremental deflection of the scanning mirrors 28 and 29 through gears 87, 88 and 89, and a segmental gear arm 90 attached to the mirror shaft 71. The magnet 86 and associated elements are similar to the magnet assembly 43—48 except that contacts 91 (FIGS. 6 and 7) are provided for the phasing of the transmitting and receiving scanners as will be described.

To position the oscillating mirrors 28 and 29 to the "start" point of the vertical scan, a shaft 92 attached to the pinion gear 89 is provided with a projecting end portion adapted to receive a key 93 similar to a winding key. The gear 88 is connected to the shaft 92 through a one-way drive clutch 94 so that the shaft may be turned by the key 93 during the resetting of the mirrors 28 and 29 without turning the gear 88 and the escapement ratchet wheel 83. When the key 93 is turned until the segmental gear arm 90 engages a stop 95, the scan mechanism is set in the "start" position. When the actuating pulses are impressed on the electromagnets 44 and 86 by closure of a start switch (not shown), the mirrors 28 and 29 are deflected to effect vertical scan by the tension of springs 80 and 81 under control of escapement 83–84.

For the purpose of phasing the scanners 10 and 10*a* an arrangement is disclosed by way of example for varying the scan position of one scanner to match the other. In the illustrative example disclosed herein, the control knob 22 of the pulse generator 21 may be set to its midpoint for purposes of transmission. The pulses from 21 may then be permitted to reach the telephone coupling unit 15 directly in any known manner, acoustically, inductively, by capacitive coupling or by a direct connection to a leased communication channel. The same interconnection may, of course, also be practiced for transmission of image signals disclosed herein. The pulses from 21, however, transmitted, cause an audible sound or other perceptible signal, such as a "click," to reach the telephone coupling unit 19. The phasing control 22*a* may then be manually adjusted so that the click from the transmitter unit coincides in time with a second "click" obtained similarly from the local pulse generator output. These pulses (clicks) are audible to the party at the receiver, and by adjustment of phase at the receiver by comparison with locally generated pulses, phasing or framing is accomplished in accordance with the present invention. Alternatively the local phasing pulses may be derived from contacts 91 and applied to a sounder 104 by closing the switch 103 during phasing.

In the illustrative example, during the phase control knob 22*a* (FIG. 6) retards (if desired) operation of the pulse source 21*a* which may embody a tuned mechanical element 105, such as a reed or tuning fork, the phase of which is retarded momentary, or controlled by operation of a magnetic shunt or loading device 106 connected to the adjustable knob 22*a* thereby to phase the receiving scanner with the remote or transmitting scanner, by effecting coincidence of the locally generated pulses from the receiver pulse generator 21*a*.

Each required pulse source may be a blocking oscillator, multivibrator or electronic pulse source. For a multivibrator, differentiation and clipping may be desirable to obtain an accurately timed wave front. These techniques and devices are well known and described in the literature.

It will be apparent that the invention provides an image transmitting system of enhanced reliability and simple construction, adapted for the transmission and reception of pictures by an ordinary telephone user or the like. The operation does not require technical knowledge or skill, being entirely automatic once a connection to the telephone line and phasing have been accomplished. In addition, the scanner provides high quality picture reception although the design lends itself to inexpensive quantity production methods of manufacture. Various modifications in the construction shown and described for the purpose of explaining the underlying principles of the invention will occur to those skilled in the art. For example, the vertical scan steps may be made in response to direct application of the times reset pulses instead of being spring actuated.

It will be understood that the two "vertical" scanning mirrors are usually not used at the same time although synchronized in movement. One mirror is used during recording, the other for transmitting. However, if the bandwith required is available, simultaneous transmission and recording of two pictures is possible since the optics are separate.

We claim:

1. An image-transmitting and -receiving system comprising a transmitting scanner and a recording receiving scanner, each of said scanners comprising a substantially identical scanning mechanism for scanning a field in two component directions, a communication channel operatively connecting said scanners, electrical means for providing periodic scanning control signal pulses to each of said scanners, each scanning mechanism comprising deflection means for cyclically executing repeated scanning excursions in one direction at substantially constant velocity across a field to be scanned in one scanning component direction, said deflection means comprising a shaft supporting a scanning mirror, means for pivotally supporting said shaft, mechanical biasing means for biasing said shaft for scanning at said constant velocity, and means responsive to said scanning control signals pulses to initiate each scanning deflection movement of said deflection means.

2. An image-transmitting and -receiving system according to claim 1, in which said mechanical biasing means comprises a spiral spring for operating the deflection means during scanning, and said means responsive to said control signal pulses to initiate deflection movement of said scanning mechanism resets the deflection means for restarting each scanning excursion by said spring.

3. An image-transmitting and -receiving system comprising a scanner, electrical means for providing periodic scanning control pulse signals to said scanner, said scanner having a scanning mechanism comprising deflection means for repeatedly executing a scanning excursion in one direction at substantially constant velocity across a field to be scanned in one component direction of scanning, said deflection means comprising a movable scanning mirror, mechanical biasing means for moving said mirror at said constant velocity, and means responsive to said control pulse signals to periodically reset said mirror to the start-scan position to effect scanning movement for each line scan solely by said biasing means.

4. An image-transmitting and -receiving system according to claim 3, in which said means for providing a scanning control signal consists of a pulse generator having a periodic electrical-impulse output.

5. In a signal generator for generating or recording image signals comprising a scanner having, in combination, two movable radiation-directing scanning devices for effecting bidimensional scanning in two coordinate directions of scanning, at least one of said scanning devices having spring-biased mechanical drive means for moving said device to effect scanning, and means for initiating a scanning movement of said one of said scanning devices, said means comprising an electromagnet having a pivoted armature, and means operatively connecting said armature to said device to reset said device to the start-scan position at the beginning of each line scan.

6. In a signal generator for generating or recording image signals, a scanner having, in combination, a movable radiation directing scanning device for effecting scanning across a field to be scanned, said device having spring-biased mechanical drive means for moving said device at substantially constant velocity during the scanning, and electroresponsive means for initiating a scanning movement of said scanning device at the beginning of each successive line scan.

7. In a scanner for image transmission, in combination, a first pivoted, oscillatory mirror for scanning the image to be transmitted, a second pivoted oscillatory mirror for directing light upon the recording medium to reproduce the transmitted picture, a light source for impressing a modulated light beam upon said second mirror, and a third oscillatory mirror pivoted at right angles to the pivotal axes of said first and second mirrors and cooperating therewith to effect scanning in both horizontal and vertical directions during both the transmitting and receiving cycles.

8. A scanner for generating or recording image signals comprising a source of times electrical pulses, a rotatable shaft, a scanning mirror carried by said shaft, spring means for biasing said shaft for rotation, signal responsive electromagnetic means operable in response to the electrical pulses from said source for bringing said spring to a biasing or reset condition, means on said shaft to retard rotation thereof to effect velocity control while being driven by said spring, and means for releasing said shaft from said retarding means during the reset operation of said electromagnetic means.

9. A facsimile scanner comprising a horizontal and a vertical scanning mirror, oscillatory means for deflecting said horizontal scanning mirror, spring-actuated drive means force said oscillatory means to move from a start position in a scanning trace direction, retarding means for said oscillatory means tending to produce constant scanning velocity when operating in a scanning trace direction, means responsive to electric pulse signals to restore said oscillatory means to the start position, means associated with said last-named means to release said means from said start position to execute a scanning trace, separate oscillatory means for deflecting said vertical scanning mirror, and drive means to impart driving force to said separate oscillatory means to tend to move it in a direction to provide successive spacing of said horizontal scanning traces.

10. A facsimile scanner according to claim 9, in which escapement means is provided for permitting movement of said separate oscillatory means under control of said electric pulse signals.

11. A scanner for generating or recording image signals comprising a horizontal scanning mirror and two vertical scanning mirrors positioned to optically cooperate with said horizontal scanning mirror, oscillating means for deflecting said horizontal scanning mirror, spring-actuated drive means to impart driving force to said oscillating means to move it from a start position in a scanning trace direction, retarding means for said oscillating means tending to produce constant scanning velocity when moving in a scanning trace direction, means responsive to an electric signal to restore said oscillating means to said start position, means associated with said last-named means to release said means from said start position to execute a scanning trace, two separate oscillating means, one each for supporting of said vertical scanning mirrors, means connecting said separate oscillating means to operate them in unison, spring-actuated drive means to impart driving force to one of said separate oscillating means to tend to move it in a direction to provide successive spacing of said horizontal scanning traces, and escapement means for permitting movement of said separate oscillating means upon occurrence of said electric signals applied to said electric signal-responsive means.